(No Model.)
J. E. NICE.
VEHICLE WHEEL.
No. 369,202. Patented Aug. 30, 1887.
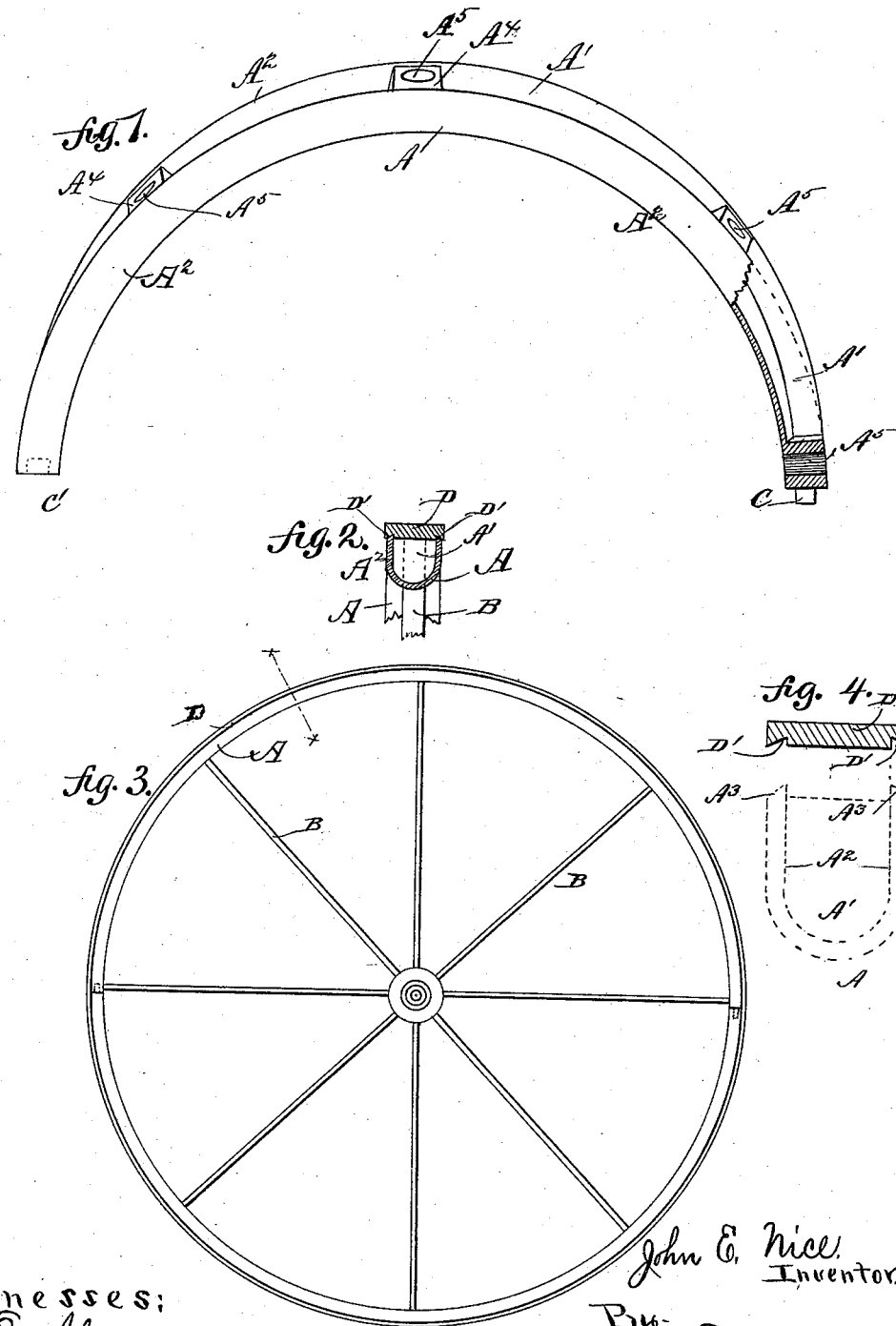
Witnesses:
C. E. Adamson
L. A. Adamson
John E. Nice,
Inventor.
By Chas. E. Adamson,
Atty.

UNITED STATES PATENT OFFICE.

JOHN E. NICE, OF FLORA, INDIANA.

VEHICLE-WHEEL.

SPECIFICATION forming part of Letters Patent No. 369,202, dated August 30, 1887.

Application filed October 15, 1885. Serial No. 179,922. (No model.)

*To all whom it may concern:*

Be it known that I, JOHN E. NICE, a citizen of the United States, residing at Flora, in the county of Carroll and State of Indiana, have invented a new and useful Improvement in Carriage-Wheels, of which the following is a description, reference being had to the accompanying drawings, which form a part of this specification.

This invention has relation to that class of vehicle-wheels having metallic fellies; and the object of the invention is to provide a wheel of the above class the rim of which will be light, strong, and durable, easy of manufacture, and cheap.

With the above objects in view, the invention consists in certain features of construction hereinafter specified, and particularly pointed out in the claim.

Referring to the drawings, Figure 1 is a perspective of a felly constructed in accordance with my invention. Fig. 2 is a transverse section on the line X X of Fig. 3. Fig. 3 is a side elevation of a wheel provided with my improved fellies, and Fig. 4 is a transverse section of the tire.

Like letters of reference indicate like parts in all the figures of the drawings.

A represents the rim of the wheel, which may comprise two or more fellies formed of malleable iron, and recessed or formed with an annular groove upon its outer or convex surface, as at A', thus forming outwardly-extending flanges A², the extreme outer edges of which are chamfered, as at A³, for a purpose hereinafter described. Within the recess A' and at suitable intervals are formed integral lugs or bosses A⁴, centrally bored, as at A⁵, for the reception of the spokes B of the wheel, which spokes are usually shouldered and adapted to bear upon the fellies.

For the purpose of facilitating the manufacture of the wheel, I construct the rim of two or more fellies, and thus it becomes necessary to provide a ready means of attachment for the same to each other to form the completed rim. At one end of the fellies I form an integral square lug, C, which, when the fellies are brought together, takes into and fits a recess, C', in the opposite felly, each felly being formed with a lug at one end, and a recess at its opposite end being of such depth as to allow for any expansion or contraction of the metal. The rim thus formed is provided with a tire, D, which is made with a V-shaped longitudinal slot or groove, D', adapted to receive and prevent the spreading of the flanges A².

The tire is suitably heated and placed in position upon the rim and allowed to cool and contract, by which contraction the fellies are bound firmly together, the lugs C being forced within the recesses C'.

By the construction just described it will be seen that a cheap, light, and durable rim is provided, the fellies of which are easily assembled, and when so assembled to form the completed rim are connected to each other without the aid of any separate fastening devices, whereby the joints are less liable to become loose and the number of pieces comprising the wheel are lessened.

I do not broadly claim any malleable felly having spoke-sockets and constructed for connection to companion fellies at its opposite ends.

The particular feature of novelty of my invention rests in providing the felly with spoke-sockets at each end, whereby when the mortise and tenon are formed at the ends for the connection of companion fellies these elements, as well as the felly itself, are stronger than when the sockets are not so located, and hence what is naturally the weakest point in a rim (the joint) is materially strengthened.

Having described my invention, what I claim is—

The malleable felly A, provided with the bracing-lugs A⁴, perforated, as at A⁵, for the reception of spokes, and provided at one end with an integral square lug and at the other end with a square recess, the lug and recess being formed, respectively, upon and with the felly-bracing spoke-sockets, which are arranged at opposite ends of the felly, substantially as specified.

JOHN E. NICE.

Witnesses:
THOS. A. HOWES,
S. W. SINCLAIR.